Jan. 10, 1956  R. C. FERGASON  2,730,378
THREE POINT QUICK HITCH MEANS FOR SEMITRAILING IMPLEMENTS
Filed March 3, 1953  2 Sheets-Sheet 2
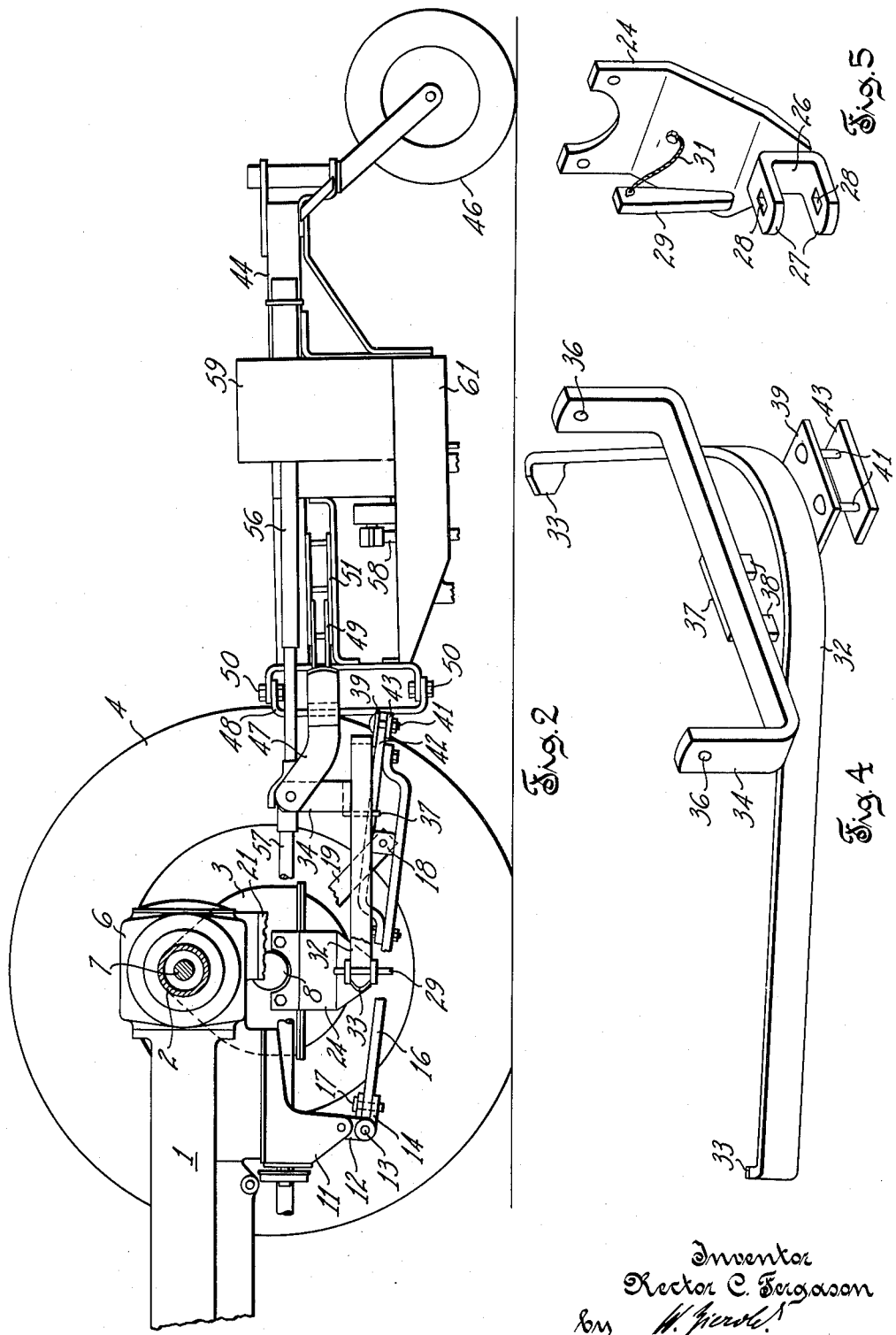

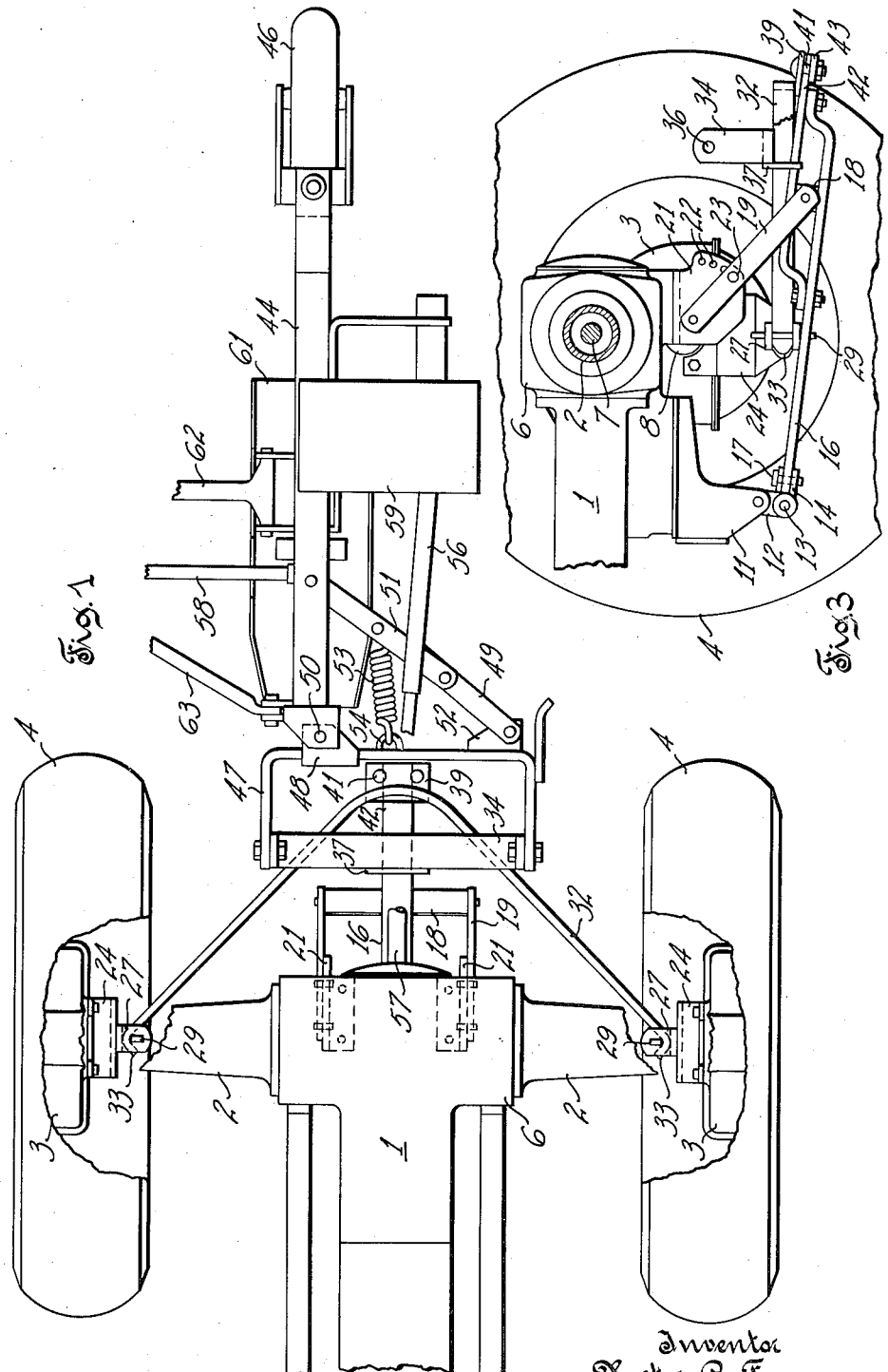

United States Patent Office 2,730,378
Patented Jan. 10, 1956

2,730,378

THREE POINT QUICK HITCH MEANS FOR SEMITRAILING IMPLEMENTS

Rector C. Fergason, Gadsden, Ala., assignor to Allis-Chalmers Manufacturing Company, Milwaukee, Wis.

Application March 3, 1953, Serial No. 339,967

12 Claims. (Cl. 280—461)

This invention relates generally to draft apparatus for agricultural implements of a type designed to be coupled in trailing relation to a propelling vehicle such as a tractor. More specifically, the present invention is concerned with the provision of a hitch means incorporating an improved construction and combination of features enabling a semitrailing type of implement to be readily attached to or removed from a tractor with a minimum of time, effort and skill.

As herein considered, a semitrailing implement is one having a forward portion supported on the rear of the tractor and a rear portion supported on one or more ground engaging wheels which are usually mounted for swiveling action. In order to provide for proper support of the forward portion of such implements on the tractor, it has heretofore been customary, particularly in connection with tractor mowers of the semi-trailer, break-back type, to connect the implement by means of a suitable hitch structure in supported relation with the bight portion of a generally U-shaped or bail-like drawbar. Such a drawbar is usually mounted with its bight portion disposed at the rear of the tractor by having its free ends attached to a pair of laterally spaced pivot supports affording vertical swinging movement but substantial lateral rigidity. Such an arrangement of the bail-like drawbar makes it necessary, if the drawbar is to serve as a support for the forward end of a semitrailing implement, that parts must be provided for holding the bight portion of the drawbar in the desired hitch means receiving and supporting relation to the forward end of the implement. Further, the hitch means must also provide a coaction of parts affording limited vertical movement between the forward end of the implement and the bight portion of the drawbar.

However, a hitch means which is generally satisfactory for use with a tractor having a transverse bail-like drawbar is usually not equally suitable, or not suitable at all, for use with a tractor which has a longitudinally extending, laterally swingable drawbar comprising in effect a single bar member extending longitudinally of the tractor beneath and, in most cases, somewhat beyond the rear end thereof. In connection with semitrailer type tractor mowers, the prevailing practice has been to provide a bolted structure simulating a transverse, bail-like drawbar and including parts operative to retain the structure in the aforementioned hitch means receiving and supporting relation. This presents certain disadvantages such, for example, as the difficulty of aligning parts with sufficient accuracy for the ready insertion of attaching bolts therethrough, and the inability to maintain the rigidity and alignment of parts requisite for satisfactory operation and durability.

In accordance with this invention, such disadvantages are satisfactorily overcome or eliminated and other improvements achieved by employing a novel construction and coaction of parts affording in effect a three point connection dispensing with the necessity of obtaining a bolt receiving alignment of coupling parts and of effectively utilizing a single drawbar member in a stabilizing capacity.

Another object of the present invention is the provision of a hitch means utilizing a rigid unit structure which may be fixedly united in detachable relation with a pair of laterally spaced tractor carried supports with a single longitudinally extending drawbar member disposed therebetween, through the use of simplified, quick attachable connections.

Still another object of the present invention is the provision of a unit hitch structure for semitrailing mowers and the like incorporating parts constructed and combined for coaction in a novel and improved manner presenting a pair of spaced laterally aligned forward connectors and an intermediate rearwardly disposed drawbar receiving part adapted for quick clamping connection therewith.

Accordingly, this invention may be considered as comprising the various features of construction, combination and/or subcombination as is hereinafter more fully set forth in the detailed description and appended claims. In this connection, a thorough understanding of the invention can be more readily obtained by reference to the accompanying drawing, wherein:

Fig. 1 is a plan view of the rear portion of a tractor having a semitrailing break-back mower detachably coupled to the tractor in accordance with the present invention, parts of the tractor and mower being broken away in the interest of clarity;

Fig. 2 is a side elevation of the combination shown in Fig. 1 with the near side wheel removed and parts broken away to better show the construction and coaction of essential parts;

Fig. 3 is a side elevation similar to Fig. 2 with the drawbar supporting bail shown in full and the mower omitted, in order to better show the coaction between the hitch means and the tractor drawbar;

Fig. 4 is a perspective view of the unit hitch structure; and

Fig. 5 is a perspective view of the bracket which is attached to the final drive housing and receives the forward inturned end of the V-shaped draft transmitting element.

Referring particularly to Figs. 1 and 2, it will be seen that the tractor 1 has a wide, drop type rear axle structure 2 presenting depending laterally opposed final drive housings 3, each of which rotatably mounts a rear traction wheel 4. In this connection it will be understood that power from an engine (not shown) is transmitted through the differential housing 6, through the oppositely extending and enclosed axle shafts 7, and then through gearing which is enclosed in the final drive housings and operatively drives the stub axles 8 supporting the rear wheels 4. Also, it is to be understood that the tractor is shown without the usual controls, operator's station, etc. which are omitted in the interest of simplicity since they form no part of the present invention.

The underside of the tractor is provided with a depending bracket 11 pivotally mounting a drawbar supporting lever 12 which extends therebeneath and presents a horizontal pivot support 13 to which is attached the forward end of the drawbar supporting element 14. A drawbar 16 has its forward end pivotally secured to element 14 for lateral swinging movement about the vertical axis afforded by the attaching bolt or pin 17. The rear end of the drawbar 16 is provided with vertically spaced portions detachably fixedly united and receiving therebetween the bight portion 18 of a depending U-shaped bail 19 having the upper ends of its leg portions pivotally secured to a pair of laterally spaced brackets 21 fixed to the underside of the differential housing 6. These brackets contain an arcuate series of holes 22 and the leg portions of the bail each contain an aperture 23 alignable with a selected one of the holes in said arcuate series for fixing the bail and thereby the drawbar in a desired vertical position. In this connection, it is to be noted that the upper portion of the drawbar extends rearwardly beyond the lower portion thereof as is best shown in Figs. 2 and 3.

Referring also to Figs. 3, 4 and 5, it will be apparent that laterally spaced underside portions of the tractor, in this case the final drive housings 3, are each provided with a bracket 24 detachably fixed thereto, these brackets each presenting a vertical surface portion 26 and a pair of vertically spaced lugs 27 extending inward from said surface portion. In this case the surface portion and lugs are formed of a single piece of material although this is unimportant insofar as the invention is concerned. Each pair of lugs 27 is provided with wedge pin receiving holes 28 aligned therethrough in generally parallel relation to the associated vertical surface portion. A wedge pin 29, insertable in said holes, is preferably attached to the bracket 24 or other suitable portion of the tractor by a flexible means such as a chain 31 so as to prevent the loss of this part upon removal from the lugs. Obviously the vertical surface portions and coacting lugs may be provided on underside portions of a tractor by any suitable constructions other than the brackets herein shown and described. Further, it should be apparent that supports of this type are also applicable to tractors having a straight through axle structure.

Referring again to Figs. 1 and 4, it will be seen that the semitrailing mower is attached to the rear of the tractor by means of a unit hitch structure comprising a bar element 32 of generally V-shape as viewed in plan, the free ends of its leg portions being similarly inturned to form bight portions 33 disposed respectively between the pair of lugs 27 presented by the brackets 24. When thus positioned, it will be apparent that insertion of the wedge pins 29 through the aligned openings 28 in the lugs 27 positions these pins in draft load transmitting engagement with the inner surface of the bight portions 33 disposed therebetween. A U-shaped part 34 is positioned with its base portion fixedly bridging the apex end portion of the V-shaped element 32 in overlying relation thereto with the legs of the U-shaped part extending vertically above and being provided with aligned openings 36 therethrough affording pivotal connection with a rear attached implement as will be hereinafter described. The base portion of U-shaped part 34 is provided with a plate 37 which depends between and beneath the leg portions of bar element 32, this plate presenting laterally spaced tabs 38 constructed to straddle the upper rear portion of drawbar 16. The apex of bar element 32 is provided with a clamp part 39 fixed thereto in rearwardly extending and generally aligned relation to the plate member 37 depending from the base portion of U-shaped part 34. Clamp part 39 is provided with a pair of depending bolts 41 spaced apart to freely straddle the rearwardly overhung end portion 42 of the drawbar 16. Thus it will be seen, that when the unit hitch structure is positioned as just described, a strap element 43 which has holes therethrough arranged to receive the pair of bolts 41 depending from clamp part 39, can be placed in engagement with the side of bar portion 42 opposite that contacted by the clamp part 39. When this has been done the hitch structure can be fixedly secured to the drawbar simply by applying and tightening the nuts on bolts 41.

The illustrated rear attached mower comprises a main frame 44 having its rear portion supported on depending ground engaging castering wheel 46 and has its forward end supported for vertical movement about a transverse hinge axis afforded by connecting the free ends of the leg portions of bail-like element 47 with the corresponding portions of U-shaped hitch part 34. Bail element 47 is operatively connected with the forward portion of mower frame 44 through a pivot support 48 affording lateral swinging movement of the main frame about the vertical pivot axis afforded by pins 50. However, lateral swinging movement of the mower frame is resisted and normally prevented by means comprising a pair of toggle links 49, 51 having their adjacent ends pivotally united with the remote end of link 51 pivoted to mower frame 44 at a point to the rear of pivot support 48 and with the remote end of link 49 pivoted to a bracket 52 fixedly carried by the bail-like element 47 in laterally spaced relation to pivot support 48. This toggle linkage is normally held in the position shown in Fig. 1, by means of a tension spring 53 having one end attached to a U-bolt 54 fixed on the bail element 47 at a point intermediate the pivot support 48 and the bracket 52, this spring having its other end connected to an intermediate portion of link 51.

The mower frame operatively mounts a drive shaft 56 deriving power from the tractor power take-off shaft 57. Power is transmitted from the shaft 56 to the pitman 58 through an enclosed flexible drive means which is not seen as it is hidden by guard members 59, 61. It is to be understood that the main frame 44 is provided with the usual drag link and pull brace elements 62 and 63, respectively, which operatively mount the inner shoe and cutter bar mechanism (not shown), the cutter bar being driven through the pitman 58 in a known manner. It is believed that a further description of mower details is unnecessary for a thorough understanding of the present invention. However, if additional information concerning the construction and operation of this mower should be desired, it may be readily obtained by referring to U. S. patent, R. B. Favor, 2,520,745, August 29, 1950.

In view of the foregoing, it should be apparent that a semitrailing mower or other form of implement can now be quickly attached to the rear of a tractor having a single drawbar member extending longitudinally thereof. Further, it should be obvious that such attachment is readily achieved by providing the implement with the unit hitch structure previously described and by providing the underside of the tractor with supports each comprising a pair of vertically spaced lugs and an associated vertically extending surface portion suitably combined for imparting a draft load transmitting connection with the forward ends of a V-shaped bar element simply by inserting a wedge pin through each pair of lugs. Moreover, it will be readily seen that the brackets herein shown and described present no real obstacle to the normal use of a tractor for purposes other than propelling semitrailing implements. Consequently these brackets may be left on the tractor and considered as a permanent part thereof. In addition, it will be evident that the unit hitch structure can either be employed as a part of the implement or it may be used with various types of implements since all that is necessary in the latter case is to provide each implement with a bail-like member of dimensions such that it can be readily connected with the upwardly extending leg portions of the U-shaped hitch part 34.

In connection with the attachment of the unit hitch structure to a tractor provided with brackets or other means presenting the lugs and surface portions described herein, it will be apparent the coaction of the lugs, surface portions, bight portions and wedge pins is such that an exact alignment of parts is unnecessary. Also as herein mentioned the unit hitch structure is in general applicable to any tractor having a wide rear axle structure. Consequently, it should now be obvious that apparatus constructed and combined in accordance with this invention inherently accomplishes the objects and affords all of the advantages hereinbefore pointed out as desirable features of a commercially satisfactory hitch means.

Therefore, it is to be understood that the invention in its broad aspects is not intended to be limited to the exact details of construction, combination and subcombination as herein disclosed for purposes of illustration as various modifications, within the scope of the appended claims, may occur to those persons skilled in the art.

It is claimed and desired to secure by Letters Patent:

1. In a tractor having a drop axle structure presenting a pair of opposed final drive housings and having in effect a single centrally disposed draft bar extending longitudinally of the tractor between said housings, the combination comprising: a pair of brackets fixed to laterally opposite portions, respectively, of said housings, said brackets each presenting a vertical surface portion and a pair of vertically spaced lugs extending inwardly from and having aligned openings therethrough in spaced relation to said vertical surface portion, a draft transmitting element of generally V-shape as viewed in plan having the free ends of its legs turned inward to form bight portions disposed, respectively, between said pairs of said lugs; a wedge pin inserted through each pair of lugs in draft load transmitting engagement with the inner surface portion of the respective bight portion disposed therebetween; a U-shaped part positioned with its base fixedly bridging the apex end portion of said V-shaped element in overlying relation thereto with its legs extending vertically thereabove, said base presenting a pair of tabs depending therefrom in straddling relation to said draft bar; a clamp part fixed to the apex end of said V-shaped element in rearwardly extending relation thereto and presenting a pair of bolts depending therefrom in straddling relation to said draft bar; and a strap part engaging the side of said draft bar opposite said clamp part and being provided with a pair of spaced holes therethrough receiving said bolts for fixedly securing the rear end of said draft bar to said clamp part.

2. In a tractor having a drop axle structure presenting a pair of opposed final drive housings and having in effect a single centrally disposed draft bar extending longitudinally of the tractor between said housings, the combination comprising: a pair of brackets fixed to laterally opposite portions, respectively, of said housings, said brackets each presenting a vertical surface portion and a pair of vertically spaced lugs extending inwardly from and having aligned openings therethrough in spaced relation to said vertical surface portion; a draft transmitting element of generally V-shape as viewed in plan having the free ends of its legs turned inward to form bight portions disposed, respectively, between said pairs of said lugs; a wedge pin inserted through each pair of lugs in draft load transmitting engagement with the inner surface of the bight portion disposed therebetween; a U-shaped part positioned with its base fixedly bridging the apex end portion of said element in overlying relation thereto with its legs extending vertically thereabove, said base presenting a draft bar receiving part depending therefrom between and beneath the leg portions of said element; a clamp part fixed to the apex end of said element in rearwardly extending relation thereto and presenting a pair of bolts depending therefrom in freely straddling relation to the rear portion of the said draft bar; and means associated with said bolts and cooperable with said draft bar for fixedly securing the rear end of the latter to said clamp part.

3. In a tractor having a wide rear axle structure and having in effect a single centrally disposed draft bar extending longitudinally of the tractor and beneath said structure, the combination comprising: a pair of brackets fixed to laterally opposite underside portions, respectively, of said tractor, said brackets each presenting a vertical surface portion and a pair of vertically spaced lugs extending away from said vertical surface portion and having openings aligned therethrough in spaced relation to said surface portion; a draft transmitting element of generally V-shape as viewed in plan having the free ends of its legs laterally offset to form bight portions disposed, respectively, between said pairs of said lugs; a wedge pin inserted through each pair of lugs in engagement with the respective bight portion disposed therebetween; a U-shaped part positioned with its base fixedly bridging the apex end portion of said element in overlying relation thereto with its legs extending vertically thereabove, said base presenting a draft bar receiving portion depending therefrom in alignment with the apex end of said element; a draft bar receiving clamp part fixed to the apex end of said element in rearwardly extending relation thereto and in alignment with said draft bar receiving portion; and a fastening means associated with said clamp part and cooperable with said draft bar for fixedly securing the rear end of the latter to said clamp part.

4. In a tractor having a wide rear axle structure and having in effect a single centrally disposed draft bar extending longitudinally of the tractor and beneath said structure, the combination comprising: a pair of brackets fixed to laterally opposite underside portions, respectively, of said tractor, said brackets each presenting a vertical surface portion and a pair of vertically spaced lugs extending away from said vertical surface portion and having aligned openings therethrough in spaced relation to said inner surface portion; a draft transmitting element of generally V-shape as viewed in plan having the free ends of its legs laterally offset to form bight portions disposed, respectively, between said pairs of said lugs; a wedge pin inserted through each pair of lugs in engagement with the respective bight portion disposed therebetween; a U-shaped part positioned with its base fixedly bridging the apex end portion of said element in overlying relation thereto with its legs extending vertically thereabove, said base presenting a pair of tabs depending therefrom in freely straddling relation to said draft bar; and a clamp means fixed to the apex end of said element in rearwardly extending, draft bar receiving relation thereto.

5. In a tractor having a drop axle structure presenting a pair of opposed final drive housings and having in effect a single centrally disposed draft bar extending longitudinally of the tractor between said housings, the combination comprising: means providing each of said housings with a pair of vertically spaced lugs having aligned openings therethrough and with a vertical surface portion extending laterally adjacent said openings; a draft transmitting element of generally V-shape as viewed in plan having the free ends of its legs laterally offset to form bight portions disposed, respectively, between said pairs of said lugs; a wedge pin inserted through each pair of lugs in engagement with the respective bight portion disposed therebetween; a U-shaped part positioned with its base fixedly bridging the apex end portion of said element in overlying relation thereto, said base presenting a depending means coacting with said draft bar to prevent lateral movement thereof; and a clamp means fixed to the apex end of said element in rearwardly extending and aligned draft bar receiving relation to said depending means.

6. In a tractor having a drop axle structure presenting a pair of opposed final drive housings, the combination comprising: a pair of brackets fixed to laterally opposite portions, respectively, of said housings, said brackets each presenting a vertical surface portion and a pair of vertically spaced lugs extending inwardly from and having vertically aligned openings therethrough in spaced relation to said vertical surface portion; an element of generally V-shape as viewed in plan having the free ends of its legs turned horizontally inward to form bight portions disposed, respectively, between said pairs of said lugs; and having an implement attaching and draft transmitting part rigidly secured to the apex end of said element; and a wedge pin inserted through each pair of said lugs in draft load transmitting engagement with the inner surface of the bight portion disposed therebetween.

7. In a tractor having a drop axle structure presenting a pair of opposed final drive housings, the combination comprising: means providing each of said housings with a pair of vertically spaced lugs having vertically aligned openings therethrough and with a vertical surface portion extending laterally adjacent said openings; an element of generally V-shape as viewed in plan having the free ends of its legs horizontally angled to form bight portions disposed, respectively, between said pairs of said lugs; and having an implement attaching and draft transmitting part rigidly secured to the apex end of said element; and a wedge pin inserted through each pair of said lugs in draft load transmitting engagement with the inner surface of the bight portion disposed therebetween.

8. A unit structure for hitching a semitrailing implement to the rear of a tractor having in effect a single centrally disposed draft bar extending longitudinally therebeneath and being secured against vertical swinging movement relative thereto, said unit structure comprising: an element of generally V-shape as viewed in plan having the free ends of its legs laterally offset to form similar bight portions for connection in draft load transmitting relation with transversely spaced portions, respectively, of said tractor; a clamp part fixed to the apex end of said element in rearwardly extending relation thereto and presenting a pair of bolts depending therefrom in laterally spaced relation so that in the connected condition of said unit structure to said tractor said draft bar will be straddled by said bolts; a U-shaped part positioned with its base fixedly bridging the apex end portion of said element in overlying relation thereto and presenting a pair of tabs depending therefrom between the legs of said element in spaced aligned conformity with said bolts; the legs of said U-shaped part extending upwardly from said element at transversely opposed sides, respectively, of said apex end portion and being adapted for connection at their free ends with said semitrailing implement; and a strap part provided with a pair of holes therethrough in receiving relation to said bolts.

9. A unit structure for hitching a semitrailing implement to the rear of a tractor having in effect a single centrally disposed draft bar extending longitudinally therebeneath and being secured against vertical swinging movement relative thereto, said unit structure comprising: an element of generally V-shape as viewed in plan with its legs terminating in opposed and similarly inturned free end portions for connection in draft load transmitting relation with transversely spaced portions, respectively, of said tractor; a clamp part fixed to the apex end of said element in rearwardly extending relation thereto and presenting a pair of bolts depending therefrom in laterally spaced relation, so that in the connected condition of said unit structure to said tractor said draft bar will be straddled by said bolts; a U-shaped part positioned with its base fixedly bridging the apex end portion of said element and presenting a pair of tabs depending therefrom between the legs of said element in spaced aligned conformity with said bolts; the legs of said U-shaped part extending upwardly from said element at transversely opposed sides, respectively, of said apex end portion and being adapted for connection at their free ends with said semitrailing implement; and a strap part provided with a pair of holes therethrough in receiving relation to said bolts.

10. A unit structure for hitching a semitrailing implement to the rear of a tractor having in effect a single draft bar extending longitudinally therebeneath and being secured against vertical swinging movement relative thereto, said unit structure comprising: an element of generally V-shape as viewed in plan with its legs terminating in opposed and similarly inturned free end portions for connection in draft load transmitting relation with transversely spaced portions, respectively, of said tractor; a clamp part fixed to the apex end of said element in rearwardly extending relation thereto and presenting a pair of bolts depending therefrom in laterally spaced relation, so that in the connected condition of said unit structure to said tractor said draft bar will be straddled by said bolts; and a U-shaped part positioned with its base fixedly bridging the apex end portion of said element in overlying relation thereto and presenting a pair of tabs depending therefrom between the legs of said element in spaced aligned conformity with said bolts; the legs of said U-shaped part extending upwardly from said element at transversely opposed sides, respectively, of said apex end portion and being adapted for connection at their free ends with said semitrailing implement.

11. A unit structure for hitching a semitrailing implement to the rear of a tractor having in effect a single draft bar extending longitudinally therebeneath and being secured against vertical swinging movement relative thereto, said unit structure comprising: an element of generally V-shape as viewed in plan with its legs terminating in opposed and similarly inturned free end portions for connection in draft load transmitting relation with transversely spaced portions, respectively, of said tractor; a clamp part extending rearwardly from the apex end of said element in a fixed draft bar receiving relation thereto, and a U-shaped part positioned with its base fixedly bridging the apex end portion of said element in overlying relation thereto with its legs extending vertically thereabove, said legs being adapted for connection at their free ends with said semitrailing implement and said base presenting a pair of spaced tabs depending therefrom between the legs of said element in aligned draft bar receiving relation to said clamp part.

12. A unit structure for hitching a semitrailing implement to the rear of a tractor having in effect a single draft bar extending longitudinally therebeneath and being secured against vertical swinging movement relative thereto, said unit structure comprising: an element of generally V-shape as viewed in plan with its legs terminating in opposed and similarly inturned free end portions adapted for connection in draft transmitting relation with said tractor; a clamp part extending rearwardly from the apex end of said element in fixed draft bar receiving relation thereto; and a U-shaped part adapted for connection at the free ends of its legs with said semitrailing implement and positioned with its base fixedly bridging an apex end portion of said element in overlying relation thereto, said base presenting means depending therefrom in draft bar receiving alignment to said clamp part.

References Cited in the file of this patent
UNITED STATES PATENTS 2,097,006     Weis                  Oct. 26, 1937
2,451,054     Atkinson             Oct. 12, 1948